US012757030B2

(12) United States Patent
Zou et al.

(10) Patent No.: US 12,757,030 B2
(45) **Date of Patent: *Oct. 6, 2026**

(54) COEXISTENCE BETWEEN RADAR APPLICATION AND COMMUNICATIONS IN A MOBILE COMMUNICATIONS SYSTEM

(71) Applicant: Telefonaktiebolaget LM Ericsson (publ), Stockholm (SE)

(72) Inventors: Gang Zou, Lund (SE); Henrik Sjöland, Lund (SE); Andres Reial, Höllviken (SE); Magnus Sandgren, Staffanstorp (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 116 days.

This patent is subject to a terminal disclaimer.

(21) Appl. No.: 18/280,905

(22) PCT Filed: Mar. 11, 2021

(86) PCT No.: PCT/EP2021/056192

§ 371 (c)(1), (2) Date: Sep. 7, 2023

(87) PCT Pub. No.: WO2022/188979

PCT Pub. Date: Sep. 15, 2022

(65) Prior Publication Data

US 2024/0147249 A1 May 2, 2024

(51) Int. Cl.
*H04W 72/23* (2023.01)
*G01S 7/00* (2006.01)
(Continued)

(52) U.S. Cl.
CPC ............. *H04W 16/14* (2013.01); *G01S 7/006* (2013.01); *G01S 7/0235* (2021.05); *H04L 5/14* (2013.01)

(58) Field of Classification Search
CPC ........ G01S 7/006; G01S 7/023; G01S 7/0235; G01S 7/034; G01S 13/88; H04L 5/0048;
(Continued)

(56) References Cited

U.S. PATENT DOCUMENTS

| | | | |
|---|---|---|---|
| 6,677,900 | B1 | 1/2004 | Thouvenel et al. |
| 8,565,114 | B2 | 10/2013 | Hottinen |

(Continued)

FOREIGN PATENT DOCUMENTS

| | | | |
|---|---|---|---|
| EP | 2779727 | A1 | 9/2014 |
| WO | 2019233830 | A1 | 12/2019 |

(Continued)

OTHER PUBLICATIONS

PCT International Search Report, mailed Dec. 10, 2021, in connection with International Application No. PCT/EP2021/056192, all pages.

(Continued)

*Primary Examiner* — Frank Duong
(74) *Attorney, Agent, or Firm* — Weisberg I.P. Law, P.A.

(57) ABSTRACT

A radar sensing function is performed in a mobile communication device that operates in a Time Division Duplex (TDD) wireless communication system having an air interface that comprises a plurality of uplink symbol times, a plurality of downlink symbol times, a plurality of TDD transmission direction transition periods, and a plurality of transition pairs of symbol times, wherein each of the transition pairs of symbol times comprises one of the uplink symbol times and one of the downlink symbol times, and each of the TDD transmission direction transition periods is associated with one of the plurality of transition pairs of symbol times and is immediately preceded by a first one of the uplink and downlink symbol times of the associated transition pair of symbol times and is immediately followed (Continued)

by a second one of the uplink and downlink symbol times of the associated transition pair of symbol times. Information about a path delay between the mobile communication device and a receiver is used as one of one or more bases to determine a timing of a radar operation window at the mobile communication device comprising a radar signal transmission period and a radar backscatter reception period.

29 Claims, 9 Drawing Sheets

(51) Int. Cl.
*G01S 7/02* (2006.01)
*H04L 5/14* (2006.01)
*H04W 16/14* (2009.01)

(58) Field of Classification Search
CPC ........ H04L 5/14; H04L 5/1469; H04W 16/14; H04W 24/08; H04W 48/12; H04W 72/02; H04W 72/0446; H04W 72/23; H04W 84/042; H04W 88/06
See application file for complete search history.

(56) References Cited

U.S. PATENT DOCUMENTS

| | | | | |
|---|---|---|---|---|
| 9,838,978 | B1 | 12/2017 | Sung et al. | |
| 9,992,051 | B2 | 6/2018 | Vilaipornsawai et al. | |
| 10,439,743 | B2 | 10/2019 | Tercero Vargas et al. | |
| 10,587,376 | B2 | 3/2020 | Behravan et al. | |
| 10,785,076 | B2 | 9/2020 | Hill et al. | |
| 11,375,543 | B2 * | 6/2022 | Sanderovich | H04B 7/0413 |
| 12,052,690 | B2 * | 7/2024 | Kaikkonen | H04W 72/23 |
| 2013/0288742 | A1 * | 10/2013 | Yao | H04B 15/00 455/553.1 |
| 2015/0063146 | A1 | 3/2015 | Sadek et al. | |
| 2015/0063321 | A1 | 3/2015 | Sadek et al. | |
| 2018/0199377 | A1 | 7/2018 | Sanderovich et al. | |
| 2019/0293781 | A1 | 9/2019 | Bolin et al. | |
| 2020/0052941 | A1 | 2/2020 | Lang et al. | |
| 2022/0256519 | A1 * | 8/2022 | Jeon | G01S 7/0235 |

FOREIGN PATENT DOCUMENTS

| | | | |
|---|---|---|---|
| WO | 2021028057 | A1 | 2/2021 |
| WO | 2021239226 | A1 | 12/2021 |

OTHER PUBLICATIONS

PCT Written Opinion, mailed Dec. 10, 2021, in connection with International Application No. PCT/EP2021/056192, all pages.

Sharma, P. et al., "Miniature Radar for Mobile Devices", 2013 IEEE High Performance Extreme Computing Conference (HPEC), Jan. 1, 2013, pp. 1-8.

Liu, F. et al., "Joint Radar and Communication Design: Applications, State-of-the-art, and the Road Ahead", arXiv:1906.00789v1 [eess.SP] Jun. 3, 2019, pp. 1-24.

3GPP TS 38.211, V15.7.0, (Sep. 2019), 3rd Generation Partnership Project: Technical Specification Group Radio Access Network; NR; Physical channels and modulation (Release 15), 97 pages.

3GPP TS 38.101-2, V16.3.1 (Mar. 2020), 3rd Generation Partnership Project; Technical Specification Group Radio Access Network; NR; User Equipment (UE) radio transmission and reception; Part 2; Range 2 Standalone (Release 16), 170 pages.

PCT International Search Report, mailed Dec. 13, 2021, in connection with International Application No. PCT/EP2021/056194, all pages.

PCT Written Opinion, mailed Dec. 13, 2021, in connection with International Application No. PCT/EP2021/056194, all pages.

Niu, Y. et al., "A Survey of Millimeter Wave (mmWave) Communications for 5G: Opportunities and Challenges", Wireless Networks, Feb. 25, 2015, 18 pages.

Qi, Z. et al., "Three-dimensional millimetre-wave beam tracking based on smart phone sensor measurements and direction of arrival/time of arrival extimation for 5G networks", IET Journals, The Institution of Engineering and Technology, IET Microwaves, Antennas & Propagation, 2018, vol. 12 Iss. 3, pp. 271-279.

U.S. Office Action date Aug. 26, 2025 for U.S. Appl. No. 18/281,126, consisting of 19 pages.

U.S. Notice of Allowance dated Apr. 7, 2026 for U.S. Appl. No. 18/281,126, consisting of 12 pages.

C. Sturm and W. Wiesbeck, "Waveform Design and Signal Processing Aspects for Fusion of Wireless Communications and Radar Sensing," in Proceedings of the IEEE, vol. 99, No. 7, pp. 1236-1259, Jul. 2011, consisting of 24 pages.

European Communication pursuant to Article 94(3) EPC for Application No. 21711849.6 dated Jun. 17, 2026, consisting of 7 pages.

* cited by examiner

FIG. 1A
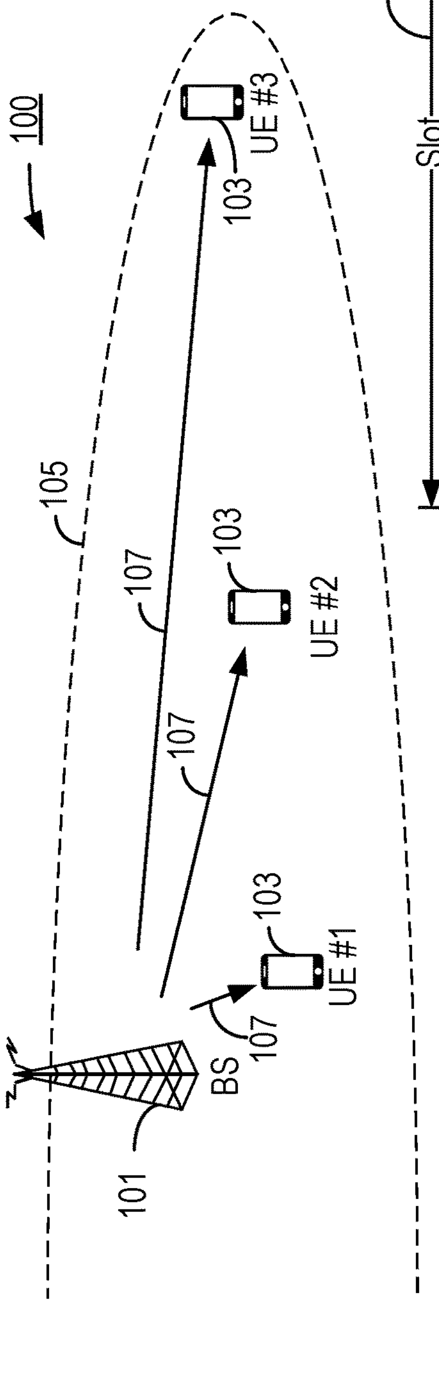
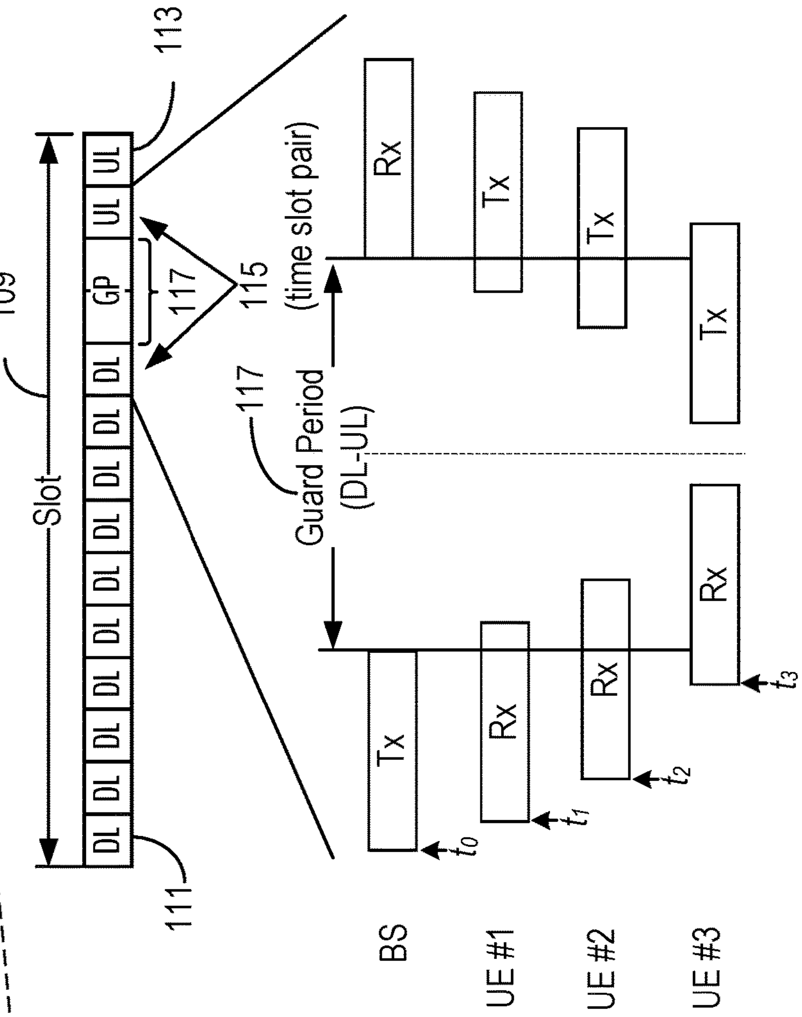
FIG. 1B

COEXISTENCE BETWEEN RADAR APPLICATION AND COMMUNICATIONS IN A MOBILE COMMUNICATIONS SYSTEM

BACKGROUND

The present invention relates to technology that enables a mobile communication device to transmit a radar signal that causes little to no interference to communications being carried out in a mobile communication system in which the mobile communication device is operating.

There is a need for applications in mobile phones and other modem-equipped devices to be aware of objects and events in their surroundings. These needs can be at least partly satisfied by means of radar sensing. Moreover, information derived from radar sensing may be combined (e.g., as in sensor fusion) with data from other sensors (e.g., cameras) to provide an even greater understanding of the device's operating environment.

Radar functionality can be integrated into a communication device such as 3GPP phone (herein denoted as "user equipment", or more simply, "UE") either by using the device's radiofrequency (RF) transceiver as a radar transmitter/receiver or by equipping the device with a dedicated radar transceiver. However, equipping a device to utilize radar in a region served by a mobile communication system presents a problem because a radar signal generally occupies a wide frequency bandwidth such that the radar signal's presence may introduce RF interference towards the base station (BS) or the device's neighboring UEs.

There is therefore a need for a solution to mitigate this interference and/or related problems.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology (e.g., methods, apparatuses, nontransitory computer readable storage media, program means) that performs a radar sensing function in a mobile communication device that operates in a Time Division Duplex (TDD) wireless communication system having an air interface that comprises a plurality of uplink symbol times, a plurality of downlink symbol times, a plurality of TDD transmission direction transition periods, and a plurality of transition pairs of symbol times, wherein each of the transition pairs of symbol times comprises one of the uplink symbol times and one of the downlink symbol times, and each of the TDD transmission direction transition periods is associated with one of the plurality of transition pairs of symbol times and is immediately preceded by a first one of the uplink and downlink symbol times of the associated transition pair of symbol times and is immediately followed by a second one of the uplink and downlink symbol times of the associated transition pair of symbol times. Information about a path delay between the mobile communication device and a receiver is used as one of one or more bases to determine a timing of a radar operation window at the mobile communication device comprising a radar signal transmission period and a radar backscatter reception period. The determined timing of the radar operation window is configured to cause the radar signal, when transmitted from the mobile communication device within the determined radar signal transmission period, to arrive at the receiver during a portion of a first TDD transmission direction transition period of the receiver; and to cause a radar backscatter signal to arrive at the mobile communication device during the radar backscatter reception period. The radar signal is transmitted within the determined radar signal transmission period.

In another aspect of some but not necessarily all embodiments consistent with the invention, the receiver is a receiver of a serving base station in the TDD wireless communication system, and using the information about the path delay between the mobile communication device and the receiver as one of one or more bases to determine the timing of the radar operation window comprises selecting one of the TDD transmission direction transition periods of the receiver that is immediately preceded by one of the uplink symbol times if the path delay between the mobile communication device and the serving base station in the TDD wireless communication system is greater than a first predetermined threshold amount; and selecting one of the TDD transmission direction transition periods of the receiver that is immediately preceded by one of the downlink symbol times if the path delay between the mobile communication device and the serving base station in the TDD wireless communication system is less than a second predetermined threshold amount.

In yet another aspect of some but not necessarily all embodiments consistent with the invention, the second predetermined threshold amount is less than or equal to the first predetermined amount.

In still another aspect of some but not necessarily all embodiments consistent with the invention, the one or more bases that are used to determine the timing of the radar operation window includes an amount of path loss between the mobile communication device and another receiving device in the TDD wireless communication system.

In another aspect of some but not necessarily all embodiments consistent with the invention, the one or more bases that are used to determine the timing of the radar operation window includes an RF signal propagation time between the mobile communication device and at least one other wireless communication device being served in the TDD wireless communication system.

In yet another aspect of some but not necessarily all embodiments consistent with the invention, the one or more bases that are used to determine the timing of the radar operation window includes an amount of interference that the radar signal would cause in a neighboring cell in the TDD wireless communication system.

In still another aspect of some but not necessarily all embodiments consistent with the invention, the one or more bases that are used to determine the timing of the radar operation window includes an amount of interference from a neighboring cell that would be coincident with one or both of the transmitted radar signal and backscatter from the transmitted radar signal.

In yet another aspect of some but not necessarily all embodiments consistent with the invention, the one or more bases that are used to determine the timing of the radar operation window includes a time budget model that comprises two or more of:

network synchronization tolerances;

mobile communication device tolerances for switching times;

a measure of mobile communication device accuracy with respect to Timing Advance;

a measure of mobile communication device Transmission/Reception switching speed;

a measure of mobile communication device receive and transmit timing accuracy;

distance-related propagation delays;

a detection range of radar operation;

a power of transmission of the radar signal;

a base station transmitter ON/OFF switching time; and a mobile communication device transmitter ON/OFF switching time.

In another aspect of some but not necessarily all embodiments consistent with the invention, the one or more bases that are used to determine the timing of the radar operation window includes information received by the mobile communication device from the wireless communication system.

In yet another aspect of some but not necessarily all embodiments consistent with the invention, the first TDD transmission direction transition period of the receiver is one of the TDD transmission direction transition periods that is immediately preceded by one of the uplink symbol times, and the one or more bases that are used to determine the timing of the radar operation window includes an assessment of uplink interference at the serving base station that will be caused by the radar signal when transmitted from the mobile communication device.

In still another aspect of some but not necessarily all embodiments consistent with the invention, the first TDD transmission direction transition period of the receiver is one of the TDD transmission direction transition periods that is immediately preceded by one of the uplink symbol times, and the one or more bases that are used to determine the timing of the radar operation window includes an assessment of uplink interference at a neighboring base station that will be caused by the radar signal when transmitted from the mobile communication device.

In another aspect of some but not necessarily all embodiments consistent with the invention, the first TDD transmission direction transition period is one of the TDD transmission direction transition periods that is immediately preceded by one of the uplink symbol times, and the one or more bases that are used to determine the timing of the radar operation window includes an assessment of downlink interference at one or more other mobile communication devices that will be caused by the radar signal when transmitted from the mobile communication device.

In yet another aspect of some but not necessarily all embodiments consistent with the invention, the first TDD transmission direction transition period is one of the TDD transmission direction transition periods that is immediately preceded by one of the downlink symbol times, and the one or more bases that are used to determine the timing of the radar operation window includes an assessment of downlink interference at one or more other mobile communication devices that will be caused by the radar signal when transmitted from the mobile communication device.

In still another aspect of some but not necessarily all embodiments consistent with the invention, the first TDD transmission direction transition period is one of the TDD transmission direction transition periods that is immediately preceded by one of the downlink symbol times, and the one or more of bases that are used to determine the timing of the radar operation window includes an assessment of uplink interference that will be caused by the radar signal at one or both of a serving base station in the TDD wireless communication system and another base station when the radar signal is transmitted from the mobile communication device.

BRIEF DESCRIPTION OF THE DRAWINGS

The objects and advantages of the invention will be understood by reading the following detailed description in conjunction with the drawings in which:

FIG. 1A illustrates an example of a mobile communication system having a BS 101 that serves three UEs in a cell.

FIG. 1B illustrates a suitable DL-to-UL guard period for use in the cell of FIG. 1A.

DETAILED DESCRIPTION

Figure 2:
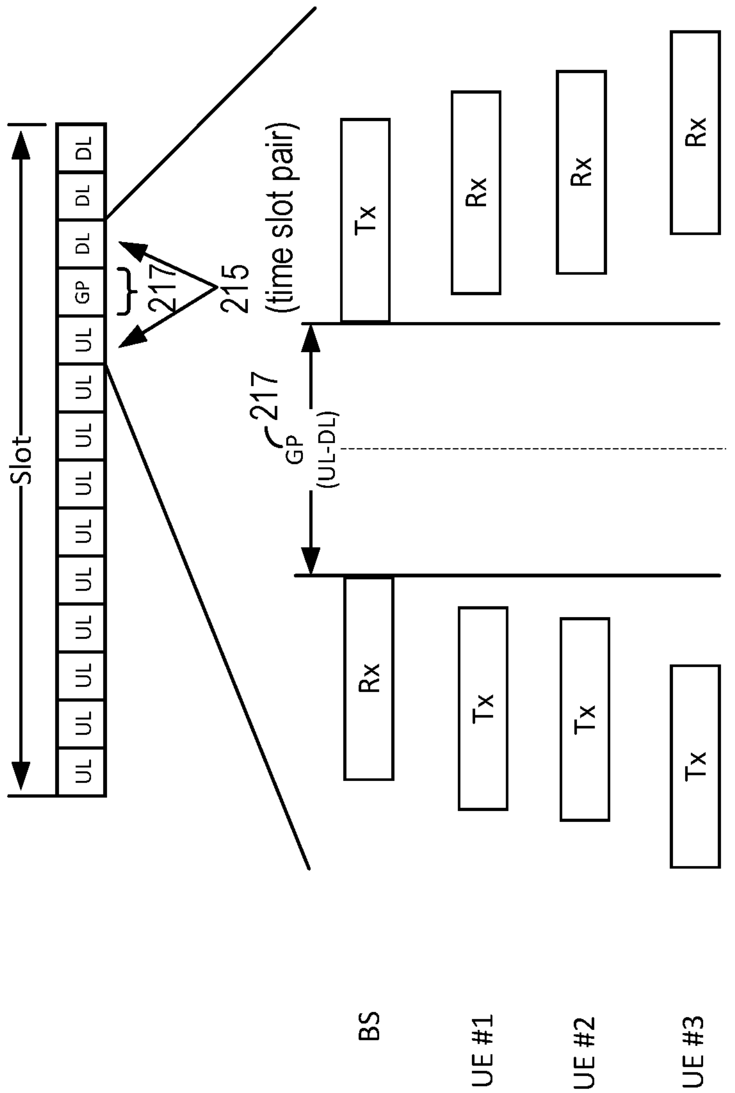
FIG. 2 illustrates an example of an UL-to-DL GP.

The various features of exemplary embodiments consistent with the invention will now be described with reference to the figures, in which like parts are identified with the same reference characters.

To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone, one or more programmed processors, or any combination of these). Moreover, the invention can additionally be considered to be embodied entirely within any form of non-transitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In accordance with an aspect of embodiments consistent with the invention, a Time Division Duplex (TDD) guard period (GP) that is typically provided in time division duplex (TDD) operation to prevent interference between uplink and downlink transmissions (and vice versa) is exploited for radar signal transmission/reception actions in a communication device (e.g., a UE).

In an aspect of some but not necessarily all embodiments consistent with the invention, a radar-enabled UE (UE-R) fetches/estimates the propagation delay of its communication radio signal transmitted to and/or received from a base station (BS). It also collects information about the duration of its radar signal to be transmitted and accordingly calculates the maximum backscatter time from the targeted sensing range. Based on this information, a suitable time window is found within a TDD GP for transmitting the radar signals and receiving the corresponding backscattered signals so that the RF interference caused by the radar signal on the TDD communication system can be avoided or mitigated. Interference criteria may include avoiding interference to the BS during uplink (UL) transmissions and/or to other UEs during downlink (DL) transmissions, and/or avoiding interference to the received own backscattered radar signal.

In particular, the UE-R may select an appropriate GP type (UL-to-DL, DL-to-UL, or both) and also select which part of the GP is usable, with selection being based on the UE's conditions in the serving cell and on its relation to other cells. For example, a UE-R situated far away from the BS will preferably use an UL-to-DL GP, while one that is close to the BS will preferably use a DL-to-UL GP.

There are different modes of radar operation:

- Monostatic radar, in which a radar transmitter and receiver are collocated
- Bistatic radar, in which a radar transmitter and radar receiver are separated by a distance comparable to the expected target distance.
- Multi-static radar, in which multiple spatially diverse monostatic radar and bistatic radar components with a shared area of coverage are operated together as a radar system. A multi-static radar system can contain one or more receivers processing reflected signals from one or more geographically separated transmitters. For example, the radar system may include one receiver and multiple transmitters, or multiple receivers and one transmitter, or multiple receivers and multiple transmitters.

In a TDD communication system, uplink signal transmissions (from UEs) and downlink signal transmissions (from a BS) use the same carrier frequency and are separated in the time domain only. An essential aspect for achieving acceptable performance in a TDD system is the provision of a sufficiently large guard period (GP) during which no transmissions occur whenever the direction of transmissions is changing (i.e., from DL to UL or from UL to DL). This guard period ensures that DL and UL transmissions from any of the UEs and the BS will not overlap (causing interference) at any of the UE and BS locations.

The DL to UL GP is obtained by using slot formats in which the DL transmission ends sufficiently earlier than the start of the UL transmission to ensure that the DL transmission from the BS will be received at a UE before any UE begins the UL transmission.

The UL to DL GP can be created by advancing the UL transmission timing at the UEs such that, at the BS, the last UL symbol before the UL-to-DL switch will end before the start of the first DL symbol transmission (in 3GPP this is a static configuration and called NTA offset with different offsets dependent on carrier frequency range—see 3GPP TS 38.133). The UL timing of each UE can be controlled by the BS by using the timing advance (TA) mechanism (a closed control loop adjusting the start of each of the UE uplink transmissions to achieve correct BS reception timing independent of RF propagation time to the base station). As the NTA part of the TA is proportional to the RF propagation distance to the base station, a larger GP is required when operating in large cells compared to small cells.

To illustrate this point, reference is made to FIGS. 1A and 1B. FIG. 1A shows an example of a mobile communication system 100 having a BS 101 that serves three UE's 103 denoted #1, #2, and #3 in a cell 105. The BS 101 is shown transmitting respective DL signals 107 to each of the UE's 103. FIG. 1B illustrates a suitable DL-to-UL GP for use in the cell 105 of FIG. 1A. The illustrated air interface utilizes a time slot structure that is subdivided into symbol times. Symbol times may be used for downlink transmissions (i.e., from a base station to one or more mobile communication devices) or for uplink transmissions (i.e., from a mobile communication device to a base station). In the illustrated example, the slot 109 comprises a plurality of symbol times utilized for DL transmissions, of which the illustrated DL symbol time 111 is one example. The slot 109 also includes several symbol times utilized for UL transmissions, of which the illustrated UL symbol time 113 is one example. A directional transition occurs whenever a DL transmission is next followed by an UL transmission, or vice versa. The two symbol times associated with the two transmissions of opposite direction are herein denoted a "transition pair of symbol times". To illustrate this point, reference is made to a transition pair of symbol times 115 shown in FIG. 1B. Each of the guard periods described above is immediately preceded by a first one of the transition pair of symbol times and is immediately followed by a second one of the transition pair of symbol times. This is illustrated by the guard period 117 (see again FIG. 1B), which in this example is immediately preceded by a DL symbol time and is immediately followed by an UL symbol time. It will be observed that the duration of a guard period 117 coupled with an associated NTAoffset and timing advance may span more than one symbol time within a slot 109. In the non-limiting example of FIG. 1B, the duration spans two symbol times.

As further shown in FIG. 1B, the BS 101 transmits the signals 107 starting at a time denoted $t_0$. The UE #1, being the closest to the BS 101, receives the signal 107 at a time $t_1$. The UE #2, being the mid-distanced of the three UE's, receives the transmission sometime later, at $t_2$. The most distant from the BS, UE #3, receives the DL transmission the latest, at $t_3$. It can be seen that each UE's received signal extends farther into the GP 117, the more distant the UE 103 is from the BS 101. But because the GP 117 is introduced between transmission and reception in the BS 101, there is no overlap of signals between DL and UL at either UE or at the BS 101.

In addition, it can be seen that each UE's timing-advanced UL signal transmission begins at a suitable time within the GP 117 that is later than the latest-possible appearance of the DL transmission 107, and timed to cause the UL signal to be received at an expected symbol time at the BS 101.

FIG. 2 shows an example of an UL-to-DL GP 217. Analogous to the DL-to-UL GP 117, the UL-to-DL GP 217 is immediately preceded by a first one of the transition pair of symbol times 215 and is immediately followed by a second one of the transition pair of symbol times 215.

The required length of the GPs 117, 217 depends on several factors. Each should be sufficiently large to provide the necessary isolation to avoid intercell interference around the TDD switching points.

The following two factors define the length of an UL-to-DL GP 217 (e.g., NTAoffset in the 3GPP standards):

- TX Transient period of BS and UE (e.g. transient ramping up or down power with relation to a defined OFF power, specified in 3GPP TS 38.101 and TS 38.104 with relations to frequency range)
- Time synchronicity among cells (e.g. synchronization accuracy of 3 μs specified in 3GPP TS 38.133)

The above two factors are likewise considered when dimensioning the length of the DL-to-UL GP 117, and in addition, consideration is given to the following additional factors:

- The RF round trip time (RTT) between a UE 103 at the cell's edge and the BS 101
- Intercell interference from DL transmission in neighboring cells must decay to a sufficiently low level before the BS can start to receive UL transmissions (hence depends on the deployment and cell overlap).

In addition to TDD interference considerations, the GPs must of course allow BS and UE transmission (Tx) and reception (Rx) switching times (e.g., an allowed maximum switching time for UEs is specified in 3GPP TS 38.211 with a dependence on frequency range; as expected, it correlates with the 3GPP specified parameter, NTAoffset).

Even if the system permits flexibility and configurability for spectrum efficiency, the length of the GP 117 should be kept to a minimum while satisfying the above considerations. This is especially important for systems in which switching between DL and UL occurs frequently. It can thus not be expected that the network (NW) will configure GP symbols that are a priori guaranteed to be free of any transmitted signal contents everywhere in the cell.

Consider a mobile communication system designed in accordance with 3GPP TDD New Radio (NR)/5G standards as an example: In NR/5G, the duration of a GP 117, 217 can be as long as 1 symbol (71 μs) for a subcarrier spacing of 15 kHz; and a minimum of 2 symbols (17.8 μs) for a subcarrier spacing of 120 kHz.

In an aspect of embodiments consistent with the invention, a radar-enabled UE (UE-R) determines a suitable time window within one or more GPs for performing a radar operation. If a suitable time window is available, the UE-R performs the radar operation during the time window of the GP.

As discussed earlier, GPs come in two varieties: those that separate downlink-to-uplink transitions (see, e.g., FIG. 1B), and those that separate uplink-to-downlink transitions (see, e.g., FIG. 2). Either type can be used in embodiments consistent with the invention, making the finding of a suitable time window within a GP for performing a radar operation a common aspect of all embodiments. Another common aspect is a strategy of finding a suitable time window that avoids having the transmitted radar signal cause interference to one or more other receivers. And yet another common aspect is a strategy of finding a suitable time window that permits a UE-R to receive a backscatter radar signal that is not polluted by interference from other transmitters in the area.

To further facilitate an understanding of aspects consistent with some but not necessarily all embodiments consistent with the invention, the discussion will now turn to several different embodiments.

In one embodiment, a GP for the suitable time window is determined such that the transmitted radar signal will not cause interference at a BS during UL time slots and interference to other UEs during DL time slots. The presence of other UEs can be detected from previously observed UL transmissions. The distance between a UE-R and its neighbor UEs can be estimated via a detected timing difference with respect to the UE-R's local Timing Advance (TA) parameter. Alternatively or in addition, measurements of received signal power from another UE's transmissions will give an indication of that UE's relative distance between the UE-R and the measured UE. There are still other mechanisms that can be used alone or in combination with other mechanisms, to assess a distance between a UE-R and a neighboring UE. These include:

- being in a same BS sector/Angle of Arrival (AoA) information/Angle of Departure (AoD) information (and same NTA, which is the 3GPP-defined dynamic part of TA corresponding to Round Trip Time (RTT) RF propagation delay), and/or from network based position, sharing of autonomously derived positionings. Such information can be communicated though sidelink (SL) communication.

In one aspect, a suitable time for performing a radar operation (i.e., transmission of a radar signal and/or reception of a radar backscatter signal) is determined such that the radar operation will not disrupt the UE-R's communication operation. For example, when considering a DL-to-UL GP, the radar operation window of a UE-R should keep a proper time margin for its communication Tx off/on transient period.

In another aspect, the suitable time in a GP for performing a radar operation is determined such that the UE-R (in the monostatic case) or other radio receiver (in the bi- or multistatic case) will be able to receive the corresponding backscattered signal from its transmitted radar signal. The UE-R ensures the radar transmission takes place early enough so it can receive the corresponding reflected signal at a time when no interfering communication signals or device/BS transients when switching between transmitting and receiving modes of operation (i.e., overlapping with the reflected radar signal in both the time and frequency domains) are reaching the UE-R from the BS or from other UEs.

In yet another aspect of some but not necessarily all embodiments consistent with the invention, a UE-R that is far away from the BS will preferably use an UL-to-DL GP for radar operations, while a UE-R that is relatively closer to the BS will preferably use DL-to-UL GP.

In another aspect of some but not necessarily all embodiments consistent with the invention, a UE-R allocates a suitable time window for its radar application within an appropriate GP; in other words, the UE-R determines which part of the GP can be used. This is in recognition that radar operation within some other parts of the GP may not be suitable (e.g., it may cause interference to others, or may experience interference from others).

Finding a suitable time within one of the guard periods in which to transmit a radar signal can take into consideration any of a number of factors. In one aspect, the allocation can be based on UE-R conditions in its serving cell, for example, the path loss and distance to the BS and other UEs.

In another aspect, the allocation can be based on UE-R conditions in relation to other cells, for example, interference to and/or from neighbor cells, interference to and/or from other cells in a heterogeneous network.

In yet another aspect, the allocation can be based on a time budget model that includes multiple types of contributions, for example network synchronization tolerances, UE-R tolerances for tracking base station timing and TA accuracy, UE-R capability with respect to Tx-Rx switching time, UE-R's Distance-related propagation delays, UE-R's radar transmission power, accuracy of UE-R radar transmission power control, width of radar transmission pulse, duration of radar operation, and the like.

To help UE-R on the time window allocation, the network can provide assistance to the UE-R in the form of information with respect to, for example, network time synchronization accuracy, the locations of other UE's, and the like. Further improvements in time window allocation can be achieved by enabling the network to engage in more precise UL timing control than is presently standardized for communication. If the network is aware of the radar application, a more precise UL timing control of the UE-R can, for example, be based on UL communication signals, as is known in the art, and/or by having the BS measure actual radar transmissions and use this information in its TA control loop.

In another aspect of some but not necessarily all embodiments, UE-R's can also provide assistance to the network in the form of information about, for example, UE-R capability with respect to Tx-Rx switching speed, UE-R capability with respect to TA accuracy (i.e., better DL to UL timing accuracy), and the like.

In another aspect of some but not necessarily all embodiments, if a suitable occasion for performing a radar operation is not available/not found, the UE-R may perform an alternative action. For example, the UE-R can coordinate with the network to enable its transmission of a radar signal during non-GP symbols. A proper radar transmission power control (TPC) can be applied to avoid the radar signal affecting the BS or other UEs. For example, a UE-R that is situated far away from BSs can then use low power radar transmissions during UL symbols.

The TPC mechanism can also be used for radar transmissions within the GP. For example, during the latter part of the UL-to-DL guard period the radar transmission might not be isolated in the time domain to a more distant UE that is close to the BS and hence receiving DL transmissions early and interference from the UE-R at cell edge "late" (see discussions below with respect to FIGS. 5A and 5B). However, above a certain aggressor/victim distance, since the interference decays with distance (due to pathloss and dependent transmission power) it gets below a critical interference level (even if a larger propagation delay between aggressor and victim in this case is a disadvantage for time domain isolation, above a certain propagation distance the interference power will be below a critical threshold). The UE-R may therefore omit time-domain isolation if the interference level at the victim receiver is estimated to lie below a threshold. By using TPC, the UE-R is able to control the geographical point at which lack of time domain isolation is no longer a problem.

Various aspects mentioned above, as well as others, will now be described in further detail. The discussion begins with a 3GPP compliant UE-R taken as an example. When the UE-R is performing one or more aspects of radar functionality within a GP and keeping necessary timing margins, it needs to have better performance than the worst case on, for example, UE TX transient period as specified in 3GPP TS 38.101-2, v16.3.1, Section 6.33. It also needs to implement methods to determine conditions and durations where it is possible to perform a radar operation with no or low interference risk.

A UE-R is preferably designed to keep a more precise timing relation to the BS (e.g., more accurate uplink timing than the 3GPP specified worst case). This would give it better timing margins for its radar operation. In addition to UE timing capability, a UE-R may also advantageously be designed to receive a better timing resolution and accuracy from the BS as part of the TA control loop. In one embodiment, the UE may track its DL timing offset changes and integrate the detected offsets over time dead-reckoning-style even if the offset is subsequently continuously adjusted. The UE may also use positioning-based approaches to determine its distance to the BS.

Consider a device implemented with a fast Tx/Rx antenna switch for purposes of realizing a monostatic mode radar device. In order to detect a target in a certain range, the radar pulse width τ must be less than the round-trip time delay of the radar signal as shown in Equation 1):

$$\tau < 2 * R_{min}/c \tag{1}$$

where $R_{min}$ is the minimum range the radar can detect, c is the speed of light, τ is the maximum width of the radar pulse, and the factor 2 accounts for the round-trip for a monostatic mode radar operation.

Assume the delay of the antenna switch is 1 ns. Devices with such capability are described in, for example, International Application No. PCT/EP2020/064810. On such basis, it is estimated that:

- In order to detect targets within a range of 120 meters by means of a radar pulse having a length of 400 ns and a transmission power of 27 dBm, the total duration of monostatic radar operation is 120 ins (it is worth noting that in general, the radar detection range depends on the transmission power, and the radar time window duration depends on detection range);
- In order to detect targets within a range of 10 meters by means of a radar pulse having a length 10 ns and a signal transmission power of 0 dBm, the total duration of monostatic radar operation is 78 ns; and
- In order to detect targets within a range of 1 meter by means of a radar pulse having a length of 2 ns and a radar signal transmission power of −30 dBm, the total duration of monostatic radar operation is 10 ns.

In all cases, the radar signal transmission and detection must fit into the GP fraction that is usable for radar transmission. The fraction therefore determines the maximum radar sensing range in the GP-based approach.

For a UE-R to find a proper radar operation window in a GP, the first priority is to avoid acting as an aggressor causing interference to the BS and other UEs. The second priority is reducing the risk of interference to the radar operation itself.

As interference generated by the UE-R is related to radiofrequency (RF) pathloss, inter-cell timing misalignment occurs between cells and thereby additional margins for TDD cell timing errors would in most relevant cases only apply for operation closer to cell edge. In other words, a UE operating close to its BS would, due to reduced path loss, have a lower risk of causing interference to UEs at other cells or towards the BS of a neighbor cell. For these reasons, there is less of a need to take margins for inter-cell timings into consideration.

Also, for heterogenous operation, radar operation at the edge of a small cell could be associated with a need for additional margins to take into account that a nearby UE could be connected to a larger cell with significant difference in RF propagation time (i.e., it could receive a downlink transmission later than a UE in a small cell). In general, all UEs close to the base station of the small cell would be connected to the small cell. It also follows from the foregoing that a UE operating at the cell edge would have less available time for radar operation within the downlink-to-uplink guard period due to RF propagation delays.

It can be seen from the above that a UE-R's location within a cell affects what factors to consider with respect to interference and switching time, and this can be explored and used by the UE-R to improve radar-related performance (e.g., based on 3GPP accumulated TA or more precisely the dynamic part of the TA reflecting RF propagation and called "NTA").

The discussion will now focus on embodiments in which radar functionality is performed during a DL-to-UL GP. In such cases, radar-to-BS interference is avoided if the radar signal is transmitted by a UE-R prior to its UL start instance, taking into account the TA with respect to the serving cell. But a timing that is suitable for use in the UE-R's own cell may cause interference with respect to neighboring BSs if the UL propagation time to those BSs is much longer than to the UE-R's serving BS. However, this also means there will be a larger path loss and lower RX signal level at the other BSs, which helps mitigate the interference. The UE-R may estimate possible adverse effects by estimating the relevant delays and path losses.

The Radar-to-UE interference relationship is generally present in the beginning of the DL-to-UL GP if a radar signal is transmitted just after the end of a DL symbol (timing at UE). UEs located in the vicinity of the UE-R where the pathloss of the radar signal is low have the same DL symbol end time after considering propagation. The radar signal should then not affect the DL of other UEs' DL reception unless there is a direct propagation path (e.g. LOS) to a UE from the UE-R but a very remote path (long reflections etc.) to that UE from the BS; in other words, if the aggressor UE-R and its victims are within a relatively close vicinity (pathloss) to one another but experience a difference in RF propagation to the BS, the UE-R may be able to detect this by comparing its own TA with a detected start time of UL transmission of the other UE. In combination with this or in the alternative, the UE-R can provide margins to compensate for the possibility of such events.

Figure 3:
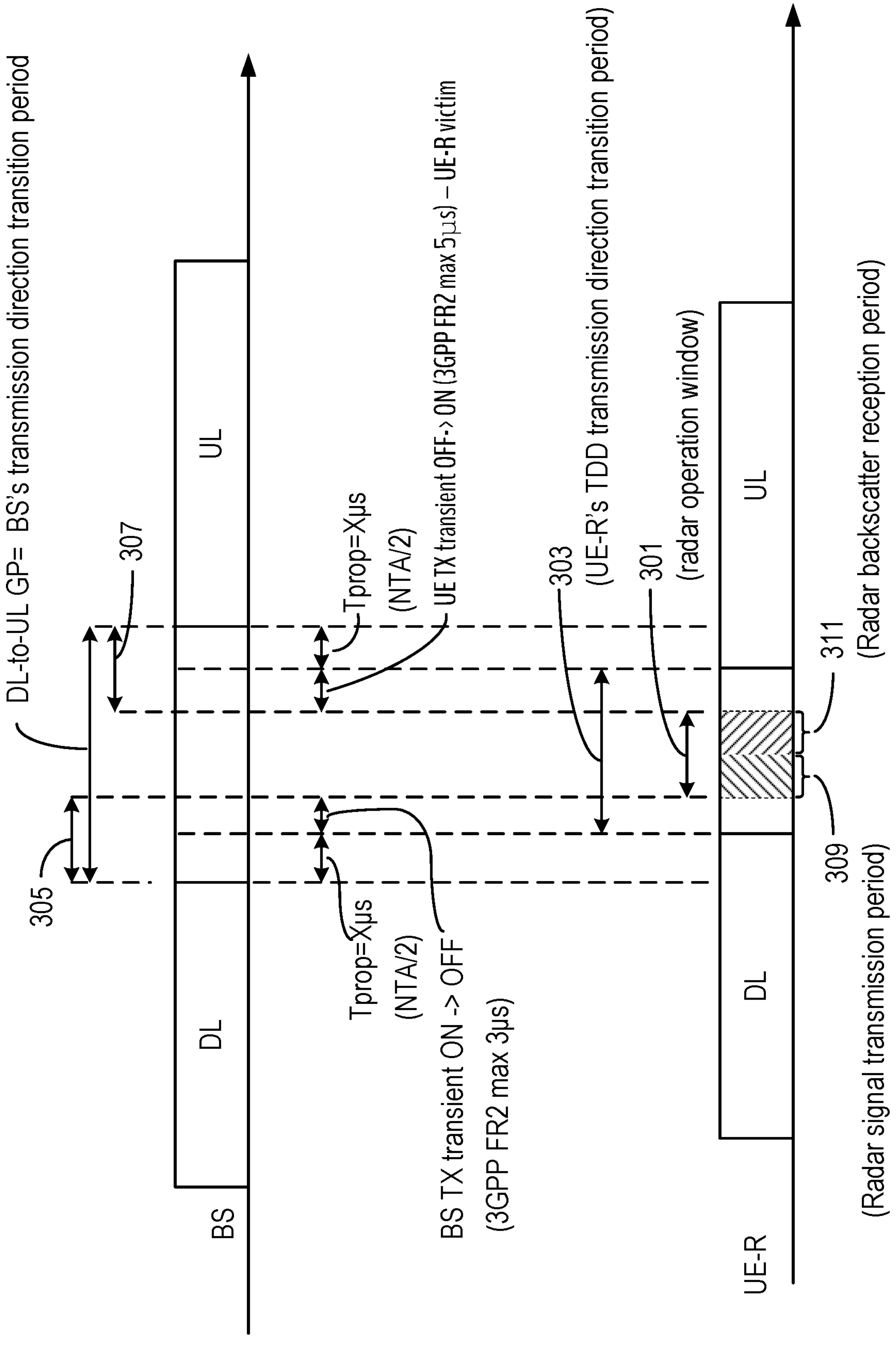
FIG. 3 illustrates an example of a radar operation window allocated within a DL-to-UL GP based on existing 3GPP specifications, where the possible durations of a radar operation window depend on UE-R RF propagation time to the base station.

FIG. 3 shows an example of a radar operation window 301 allocated within a DL-to-UL GP 303 based on existing 3GPP specifications, where the possible placement and duration of a radar operation window depends on the UE-R RF propagation time to the (serving) base station. The goal is to set radar operation window placement and duration parameters such that the UE-R's radar operation will be non-aggressive to other devices and also such that the UE-R's radar operation (i.e., transmission of radar signal and receipt of backscatter signal) will have a reduced susceptibility to interference from other units (e.g., base station and other UEs). (It is believed that the UE-R as a victim of transmissions from others is a lower priority concern and is case dependent.) In accordance with the goal, the radar operation window 301 comprises a radar signal transmission period 309 and a radar backscatter reception period 311. Transmission of the radar signal may occur within the radar signal transmission period 309 and need not occupy the entire radar signal transmission period 309. Similarly, the UE-R may operate its receiver to receive a radar backscatter signal within the radar backscatter reception period 311 and need not do this for the entire radar backscatter reception period 311. It is noted that this description applies to the case of monostatic radar, in which a same UE-R performs both the transmitting and receiving. However, in other embodiments, these separate actions (transmitting and receiving) may be performed by two or more devices (i.e., as in bi-static and monostatic radar).

In the downlink-to-uplink transition scenario, the flow of operations is:

BS DL TX→UE-R TX→UE-R RX (listening for radar backscatter)→BS UL RX

For a UE-R located close to its serving BS with enough isolation to inter-cell UEs (and BSs), the interference caused by the radar signal to inter-cell UEs can be neglected; and the additional margin of inter-cell TDD timing misalignment will be much less than the worst case specified in 3GPP (i.e., 3 μs). In addition, a BS in normal operation generally has better relative timings so it can inform the UE-R about inter-cell synchronicity (either through estimates or through measurements).

Finding a suitable start time for the radar operation window 301 involves, in one respect, a UE-R considering the following timing margins with respect to a beginning portion 305 of the DL-to-UL TDD transmission direction transition period 303 of the UE-R:

1. RF propagation time from the BS to other nearby UEs in order to avoid being an aggressor and causing interference towards other nearby UEs' DL reception
   a. An accumulated value of NTA/2 as part of the TA control loop or an improved more accurate version of this can be used as an estimate of RF propagation time between the BS and the UE-R.
2. The BS TX transient period in order to avoid having the transmitted radar signal become a victim of interference from transient signals emitted by the base station during the time it switches its transmitter from ON to OFF.
   a. In some instances, it may be determined that the BS has a TX transient period that is shorter than, for example, the 3GPP specified worst case. Such a determination can be made from either information received from the BS or through the UE-R's own measurements.

The second timing margin described above (i.e., BS TX transient period) will also provide margins to a potential nearby (pathloss wise) UE victim having a different RF propagation time towards the BS than the UE-R, so that the radar transmission should be delayed to avoid causing interference to nearby UEs having a longer DL reception path.

In an end portion 307 of the UE-R's DL-to-UL TDD transmission direction transition period 303, the following timing margins should be considered by a UE-R when determining the start time and duration of the radar operation window 301:

1. RF propagation time to the BS in order to avoid being an aggressor that causes interference towards the BS's uplink reception.
   a. The RF propagation time between the BS and the UE-R can be estimated as an accumulated value of NTA/2 as part of the TA control loop; alternatively, an improved more accurate version of this could be used b. The fact that radar transmission occurs in the starting part of the radar operation window can be used.

2. The UE TX transient time from OFF to ON, to avoid being a victim and interfered during UE TX transient from OFF to ON occurring before its actual transmission.

a. The UE-R could determine which, if any, nearby UEs have a shorter TX transient time than, for example, the worst case specified in 3GPP by using information shared from the BS or from other UEs or by measuring.

If the size of the radar operation window is smaller than an estimated "safe" region, further fine tuning of its offsets within the "safe" region can be done. For example, additional margins in the beginning of the DL-to-UL GP 303 can be assigned to further reduce interference to radar operation due to distant BS late arriving DL. In addition, or alternatively, further margins in the end portion of the DL-to-UL GP 303 can be provided (as determined by the UE-R) if interference from other early UE UL transmissions exists.

To illustrate the above-described aspects, consider an example in which the UE-R operates in an air interface having 3GPP FR2 communication signal having a subcarrier spacing (SCS) of 120 kHz and in which the length of the DL-to-UL GP 303 is 10.8 µs. For a UE-R that is 100 m away from the BS, the available radar operation window can be estimated as follows:

$$10.8\ \mu s-2{*}X\ \mu s-3\ \mu s-5\ \mu s=2.8\ \mu s-2{*}X\ \mu s \qquad \text{Example duration}$$

Assuming X=0.33 µs (using data from 3GPP specifications) (i.e., 100 m from BS), this yields a radar operation window of 2.1 µs.

As mentioned earlier, the radar operation window for a UE-R at a cell edge has a smaller time margin in the DL-to-UL GP 303. The inter-cell TDD time misalignment also needs to be taken into consideration.

Figure 4:
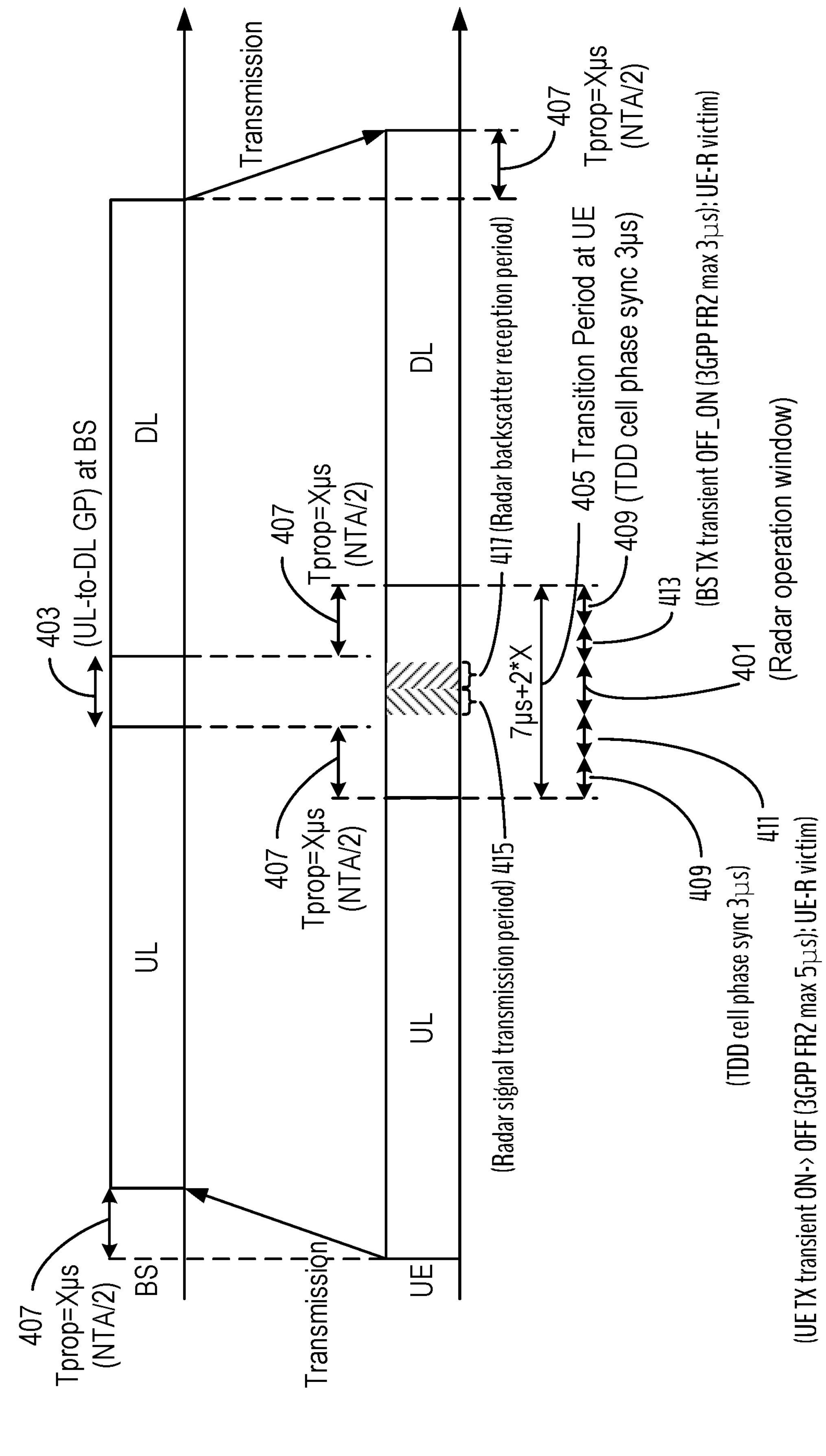
FIG. 4 illustrates an example of a radar operation window allocated within a DL-to-UL GP.

Looking now at a different embodiment, FIG. 4 shows an example of a radar operation window 401 allocated within a UL-to-DL GP 403. The radar operation window 401 comprises a radar signal transmission period 415 and a radar backscatter reception period 417. Transmission of the radar signal may occur within the radar signal transmission period 415 and need not occupy the entire radar signal transmission period 415. Similarly, the UE-R may operate its receiver to receive a radar backscatter signal within the radar backscatter reception period 417 and need not do this for the entire radar backscatter reception period 417. It is noted that this description applies to the case of monostatic radar, in which a same UE-R performs both the transmitting and receiving. However, in other embodiments, these separate actions (transmitting and receiving) may be performed by two or more devices (i.e., as in bi-static and monostatic radar).

In the context of a radar operation that is to be performed in the transition period that separates an uplink transmission followed by a downlink transmission, the flow of operation can be summarized as:

UE UL TX→UE-R TX→UE-R RX (listening for radar backscatter)→UE DL RX

The timing of the radar operation window 401 is configured to:

cause the radar signal, when transmitted from the mobile communication device at the determined radar signal transmission time, to arrive at the receiver (e.g., of the base station) during a portion of a first TDD transmission direction transition period associated with the (e.g., base station) receiver; and cause the radar backscatter reception period to occur during a second TDD transmission direction transition period, this one being associated with the mobile communication device.

For a UE-R 1200 m away from the BS and using data from 3GPP specifications, the available radar operation window 401 is estimated to be 1 µs. More particularly, some factors that can be considered include:

The serving base station's UL-to-DL GP 403; and a path delay amount 405 between the mobile communication device and the base station's receiver. Assuming symmetrical path delay times in both the uplink and downlink directions, the path delay amount 405 (Tprop) may be taken in this example to be NTA/2 (as given by 3GPP specifications).

The radar operation window 401 needs to be timed such that it can be started and completed all within the UE-R's TDD transmission direction transition period 405, which is centered around the base station's GP 403 and enlarged at both the beginning and end portions to account for both uplink and downlink path delay amounts, respectively.

In some embodiments, it is desired to provide improved performance by ensuring that UE-R's radar operation will be non-aggressive to other devices (i.e., the serving base station and also other receiving devices that are within range of the planned radar signal transmission).

In another aspect of some embodiments, it is desired to provide improved performance by ensuring that reception of the radar signal's backscatter will have at least reduced susceptibility to interference from the transmissions of other devices (e.g., from the serving base station as well as from other devices).

To achieve one or both of these improvements, additional factors that can be considered include:

a timing margin to account for TDD cell phase synchronization error 409 (both before and after the radar operation window 401;

A timing margin 411 prior to the radar operation window 401 to protect the transmitted radar signal from interference caused by signal transients produced when a UE switches its transmitter from an ON to OFF state. This can be, for example, 5 µs maximum according to 3GPP FR2 specifications.

A timing margin 413 following the radar operation window 401 to protect the transmitted radar signal from interference caused by signal transients produced when the BS switches its transmitter from an OFF to ON state. This can be, for example, 3 µs maximum according to 3GPP FR2 specifications.

Given the above parameters as an example, the radar operation window 401 can be placed as shown in FIG. 4. the exemplary radar operation window 401 would accordingly have a duration given by:

$$7\ \mu s+2{*}X\ \mu s-2{*}3\ \mu s-3\ \mu s-5\ \mu s=2{*}X\ us-7\ \mu s(\rightarrow X>3.5\ \mu s\approx 1050\ m)$$

Assuming X=4 µs (i.e., the UE-R is situated 1200 m from BS), this yields a radar operation duration of 1 µs.

Looking at the radar operation window allocation process in still greater detail, it is first observed that, for a UE-R that is close to a BS, allocating a radar operation window in an UL-to-DL GP could be challenging due to the fixed 3GPP NTAoffset value being smaller than the sum of the BS TX transient (OFF-ON) and the UE TX transient (ON-OFF). Those TX components could cause interference to the UE-R's radar operation.

In cases in which the radar operation window is narrow and interference is assessed to be low, a UE-R could deem it possible to perform a radar operation somewhere in the center of the guard period (also avoiding being an aggressor to the BS in the UL direction or towards another UE's DL reception).

For a UE-R device at a cell's edge, the TDD timing misalignment between cells needs to be considered when allocating the UE-R's radar operation window in an UL-to-DL GP.

To shed further light on some aspects discussed above, and referring again to FIG. 4, in a beginning portion of the GP 403, the following timing margins should be considered by a UE-R to allocate its radar operation window 401. These timing margins are relative to its UL transmission timing (NTA/2 advance compared to BS end of UL timing). Further margins might be needed based on errors in UE-R UL timing misalignment (e.g., errors in TA control loop). Alternatively, an improved (e.g., more accurate) version of TA can be used:

1. TDD cell phase sync 409 to avoid starting too early causing interference to a neighboring cell uplink transmission
   a. If timing relation between cells are known, reduced margins can be assigned
2. UE TX transient time 411 to avoid being a victim and interfered during UE TX transient from ON to OFF.
   a. UE-R could apply a reduced margin if nearby UEs have faster TX transient times.

At an end portion of the UL-to-DL GP 403, the following timing margins should be considered by a UE-R to allocate its radar operation window 401. These timing margins are relative to its DL reception timing (NTA/2 delayed compared to BS start of DL):

1. TDD cell phase synchronization 409 to avoid causing interference to other inter-cell UE's early DL reception
   a. If the actual timing relation between cells is actually known, smaller margins can be assigned accordingly
   b. The fact that UE-R transmission occurs at an initial part of the radar operation window 401 can also be taken into account
2. BS TX transient time 413 to avoid interference during BS TX transient from OFF to ON.
   a. UE-R could apply less margin if less transient experienced than e.g. 3GPP specified.

As shown in FIG. 4, the width of a possible radar operation window 401 depends on the above-listed factors as well as on the RF distance (e.g., amount of path/propagation delay) to the BS.

In some situations, for example involving heterogenous deployments, additional considerations may need to be taken into account when determining placement of the radar operation window 401. Such additional considerations arise from the UE-R's distance from its own base station, its position with respect to other UEs (including possibly those in neighboring cells), and cell size. For example, consider the situation depicted in FIG. 5A A UE-R 501 that is connected to a serving base station 503 transmits a radar signal that can reach a nearby UE-A 505 a more distant UE-B 507 that is close to the serving base station 503, and also a nearby UE-C 509 that is served by a base station 511 of a neighboring cell.

Suppose the cell that is serving the UE-R 501 is small and that the UE-R 501 is located at the edge of its serving cell. Suppose further that the UE-C 509 is also at the edge of its serving cell, but that it is in a large cell (i.e., compared to the UE-R's serving cell). Due to the larger distance, the UE-C 509 connected to the base station 511 of the large cell will have a larger timing advance than any device in the UE-R's own cell, and will accordingly transmit its UL signals "earlier" than devices in the UE-R's serving cell and will also receive its DL signals later than devices in the UE-R's serving cell. Consequently, the UE-C's 509 transmissions will not interfere with the UE-R's radar signal transmissions (in the beginning of the UE-R's uplink-to-downlink TDD transmission direction transition period) nor will neighboring transmissions directed at the UE-C 509 interfere with the UE-R's reception of backscatter (at the end of the uplink-to-downlink TDD transmission direction transition period).

However if the UE-R were instead situated in a large cell and the neighboring UE-C instead situated in a small cell, the UE-R's radar transmissions could be subjected to interference (in the beginning part of the uplink-to-downlink TDD transmission direction transition period) from the small cell UE-C's 509 late UL transmission and the UE-R's reception of the backscatter signal could experience interference from neighboring transmissions directed at the UE-C 509, which will arrive much earlier than downlink transmissions in the UE-R's 501 own large cell. Under these circumstances, improved radar performance can be achieved by taking these margins into account as well when deciding on a suitable placement of the radar operation window 401.

Figure 5A:
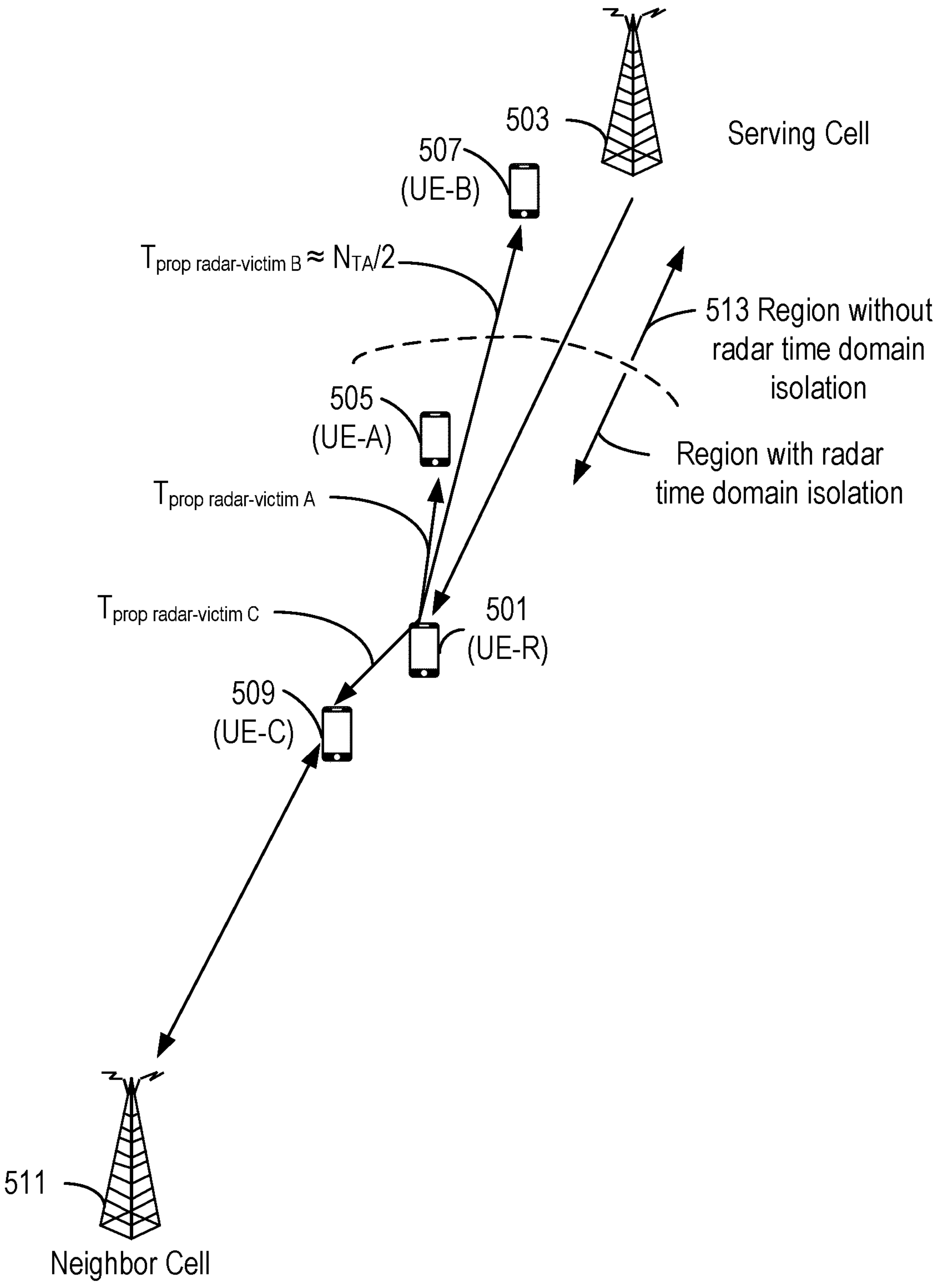
FIG. 5A illustrates an exemplary situation in which a UE-R that is connected to a serving base station and transmits a radar signal that can reach a nearby UE-A, a more distant UE-B, that is close to the serving base station, and also a nearby UE-C that is served by a base station of a neighboring cell.
Figure 5B:
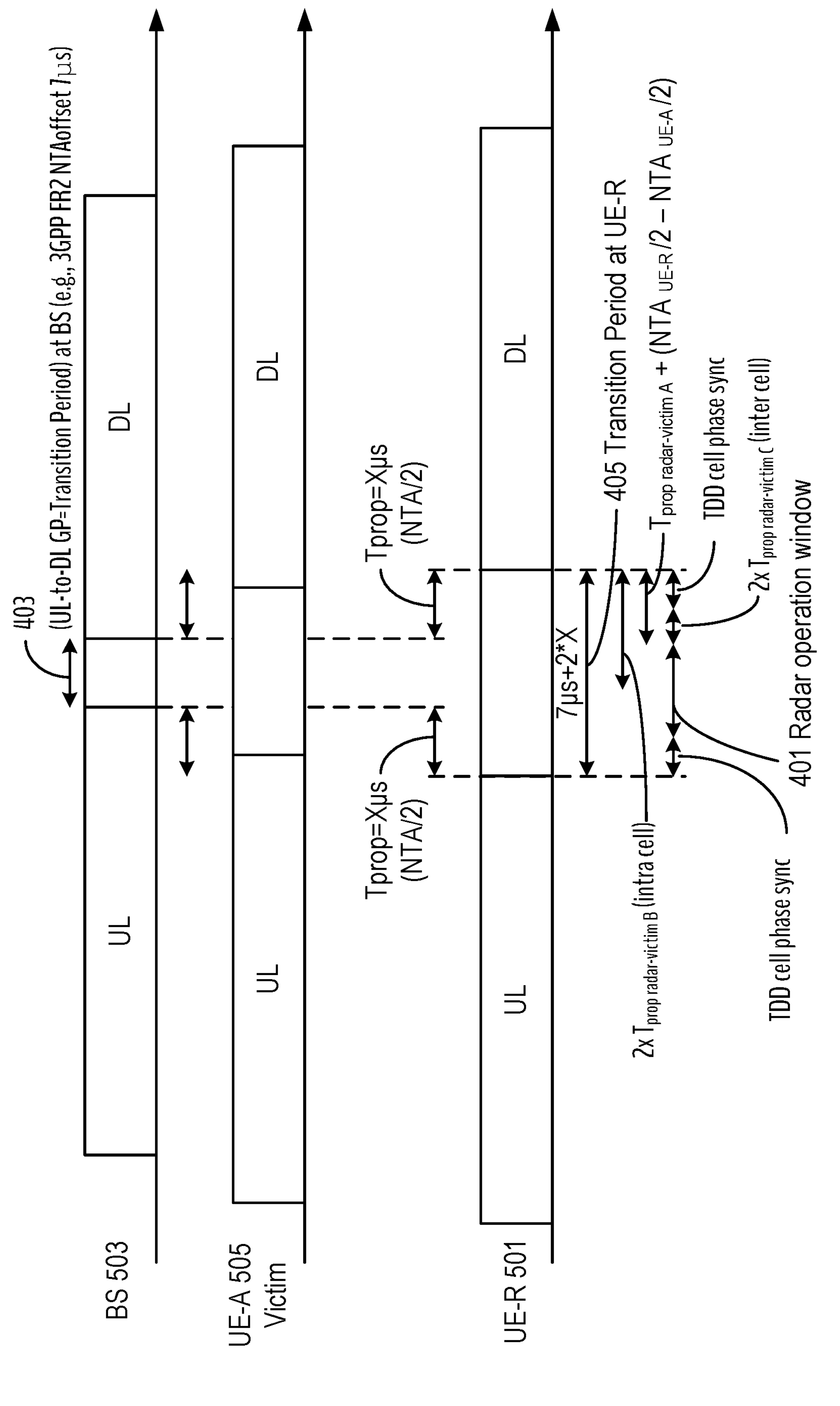
FIG. 5B illustrates exemplary timing relationships between the base station, the UE-A, and the UE-R of FIG. 5A.

In another aspect of some but not necessarily all embodiments, the UE-R 501 can also take into account timing margins that arise from particular placements of other devices within its own cell. To illustrate this point, reference is now made to FIG. 5B, which shows the related uplink and downlink timings of the base station 503, the UE-A 505, and the UE-R 501 as shown in FIG. 5A. As shown in the figure, the UE-A's 505 proximity to the UE-R 501 makes it a potential victim of the radar signal to be transmitted by the UE-R 501. Accordingly, it is advantageous to position the radar operation window 401 such that the transmitted radar signal will reach the UE-A 505 during the UE-A's TDD transmission direction transition period. Here are two main effects that need to be considered: 1) the radar signal propagation time ($T_{prop\ radar\text{-}victim\ A}$) from UE-R 501 to UE-A 505 (i.e., so that the interference from the radar transmission arrives later at UE-A 505); and 2) the fact that UE-A 505 receives the DL transmissions earlier than the UE-R 501 does, where the difference can be expressed as $NTA_{UE\text{-}R}/2-NTA_{UE\text{-}A}/2$. As an approximation and simplification, one can sometimes (depending on the relative positions between devices) also estimate the latter part as being the same as the first part (i.e., $\sim T_{prop\ radar\text{-}victim\ A}$). Due to this and when using UE-R DL reception as a reference, a timing margin of $T_{prop\ radar\text{-}victim\ A}+(NTA_{UE\text{-}R}/2-NTA_{UE\text{-}A}/2)$ as shown in FIG. 5B will be needed after the radar operation window 401 (i.e., at the end of the UE-R's transition period 405) or alternatively using a more simplified model representing this margin as $2\times T_{prop\ radar\text{-}victim\ A}$. Since the above relates to interference from UE-R radar transmission and the timing margin from finalizing its transmission, if transmission occurs only in the beginning of the radar operation window 401 a larger $T_{prop\ radar\text{-}victim}$ can be supported in practice. (In FIG. 5B, the margin $T_{prop\ radar\text{-}victim\ A}+(NTA_{UE\text{-}R}/2-NTA_{UE\text{-}A}/2)$ does not illustrate that the transmission within the complete radar operation window 401 could occur.

To further illustrate this point, if it were also desired to avoid having the UE-A's radar signal cause interference at the more distant device, UE-B 507, the signal propagation time from the UE-R 501 to the UE-B 507 ($T_{prop\ radar\text{-}victim\ B}$) can also be factored in as a margin. If applied as in the example involving UE-A 505, this would result in the radar operation window being further reduced in size, accordingly. However, in this example it may not be necessary to add a further margin to protect UE-B 507 from radar interference because the radar application can instead rely on the substantial pathloss between the UE-R 501 and the distant UE-B 507 which sufficiently attenuates the radar signal to a level that avoids interference. There is accordingly a region that is not protected by time domain isolation as illustrated by the region 513 in FIG. 5A.

In another aspect of some but not necessarily all embodiments consistent with the invention, if a suitable radar operation occasion is not available or otherwise not found, a UE-R may perform a radar operation outside the GP. For example, a UE-R can keep its radar transmission power significantly lower than its UL Transmission Power Control (TPC) setting to ensure negligible impact at the BS, or use a DL RX power estimate at the UE-R and a related path loss estimate, or limit radar sensing operation to directions that do not impact cellular NW operation. (Of course, radar transmission power control can be employed also when the UE-R's radar transmission will arrive within a "victim" device's guard period.)

Figure 6:
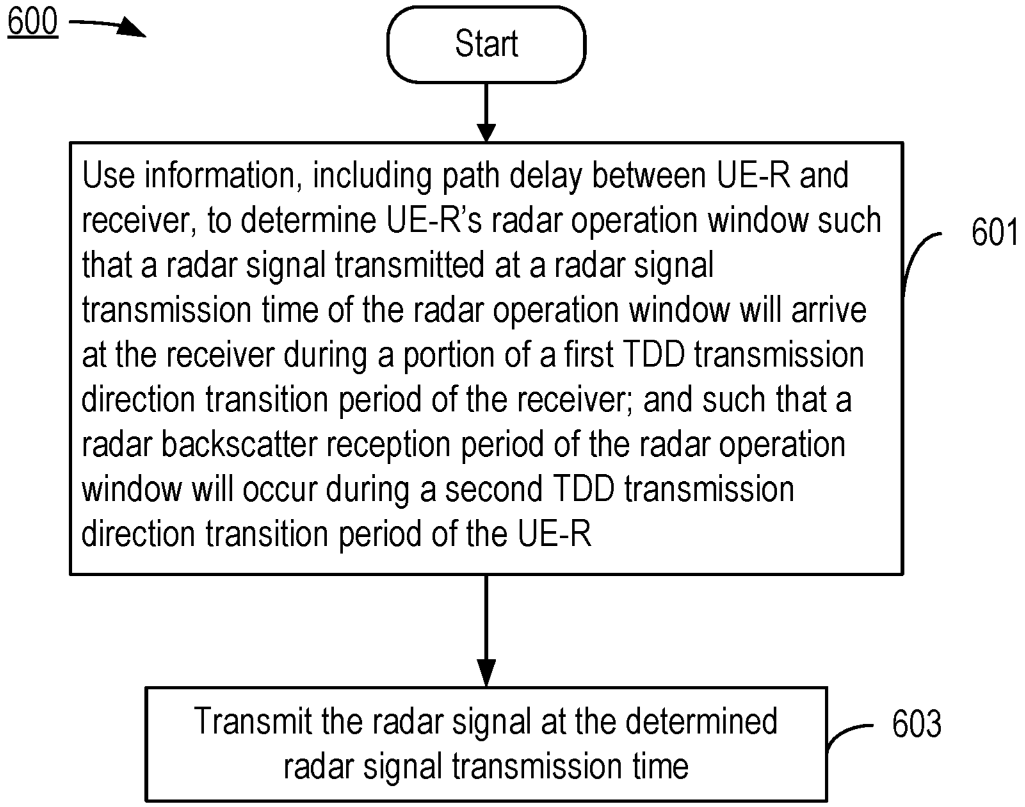
FIG. 6 is, in one respect, a flowchart of actions performed by a UE-R in accordance with a number of embodiments.

Further aspects of some but not necessarily all embodiments consistent with the invention are now described with reference to FIG. 6, which in one respect is a flowchart of actions performed by a UE-R in accordance with a number of embodiments. In other respects, the blocks depicted in FIG. 6 can also be considered to represent means 600 (e.g., hardwired or programmable circuitry or other processing means) for carrying out the described actions.

The illustrated actions are for performing a radar sensing function in a mobile communication device that operates in a Time Division Duplex (TDD) wireless communication system having an air interface that comprises a plurality of uplink symbol times, a plurality of downlink symbol times, a plurality of TDD transmission direction transition periods, and a plurality of transition pairs of symbol times, wherein each of the transition pairs of symbol times comprises one of the uplink symbol times and one of the downlink symbol times, and each of the TDD transmission direction transition periods is associated with one of the plurality of transition pairs of symbol times and is immediately preceded by a first one of the uplink and downlink symbol times of the associated transition pair of symbol times and is immediately followed by a second one of the uplink and downlink symbol times of the associated transition pair of symbol times. The actions with respect to both downlink-to-uplink transitions and uplink-to-downlink transitions include using information about a path delay between the mobile communication device and a receiver (e.g., of a potential victim which can be a base station or other wireless device) as one of one or more bases to determine (step 601) a timing of a radar operation window at the mobile communication device comprising a radar signal transmission period 309, 415 and a radar backscatter reception period 311, 417. The radar signal is then transmitted within the determined radar signal transmission period 309, 415 (step 603).

Further, the determined timing of the radar operation window is configured to cause the radar signal, when transmitted from the mobile communication device within the determined radar signal transmission period 415, to arrive at the receiver during a portion of a first TDD transmission direction transition period of the receiver; and cause a radar backscatter signal to arrive at the mobile communication device during the radar backscatter reception period 417. In alternative embodiments involving bistatic or multistatic radar, the timing is configured to cause the backscatter signal to arrive within a radar backscatter reception period at a different radar receiver.

Further aspects of some but not necessarily all embodiments consistent with the invention are now described with reference to FIG. 7, which in one respect is a flowchart of actions performed by a UE-R in accordance with a number of embodiments. In other respects, the blocks depicted in FIG. 7 can also be considered to represent means 700 (e.g., hardwired or programmable circuitry or other processing means) for carrying out the described actions.

Figure 7:
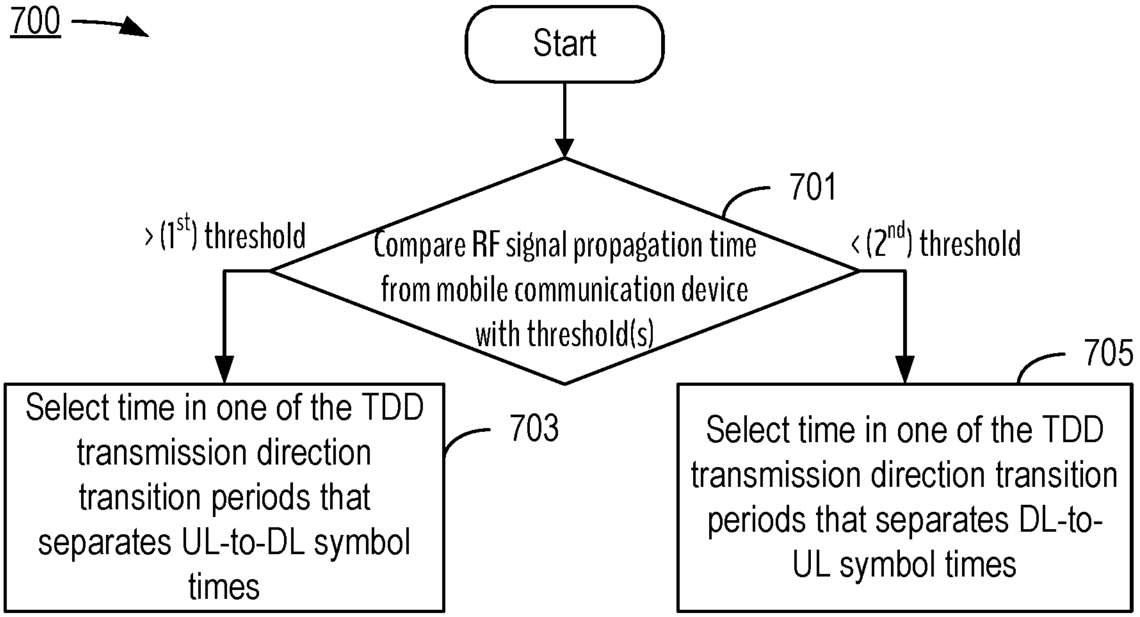
FIG. 7 is, in one respect, a flowchart of actions performed by a UE-R in accordance with a number of embodiments.

The illustrated actions of FIG. 7 concern selection of a suitable time window for a mobile communication device to perform a radar operation. The embodiment includes comparing the RF signal propagation time to the serving base station in the TDD wireless communication system with one or more predetermined threshold amounts (e.g., first and second predetermined threshold amounts) (decision block 701). If the RF signal propagation time to the serving base station in the TDD wireless communication system is greater than a (single) predetermined threshold or greater than a first predetermined threshold (">($1^{st}$) threshold" path out of decision block 701), the time for performing the radar operation is selected to be in one of the UL-to-DL TDD transmission direction transition periods (step 703). If not ("<($2^{nd}$) threshold" path out of decision block 701), the time for performing the radar operation is selected to be in one of the DL-to-UL TDD transmission direction transition periods (step 705). In some but not necessarily all inventive embodiments involving first and second predetermined thresholds, the second predetermined threshold amount is less than or equal to the first predetermined amount.

Figure 8:
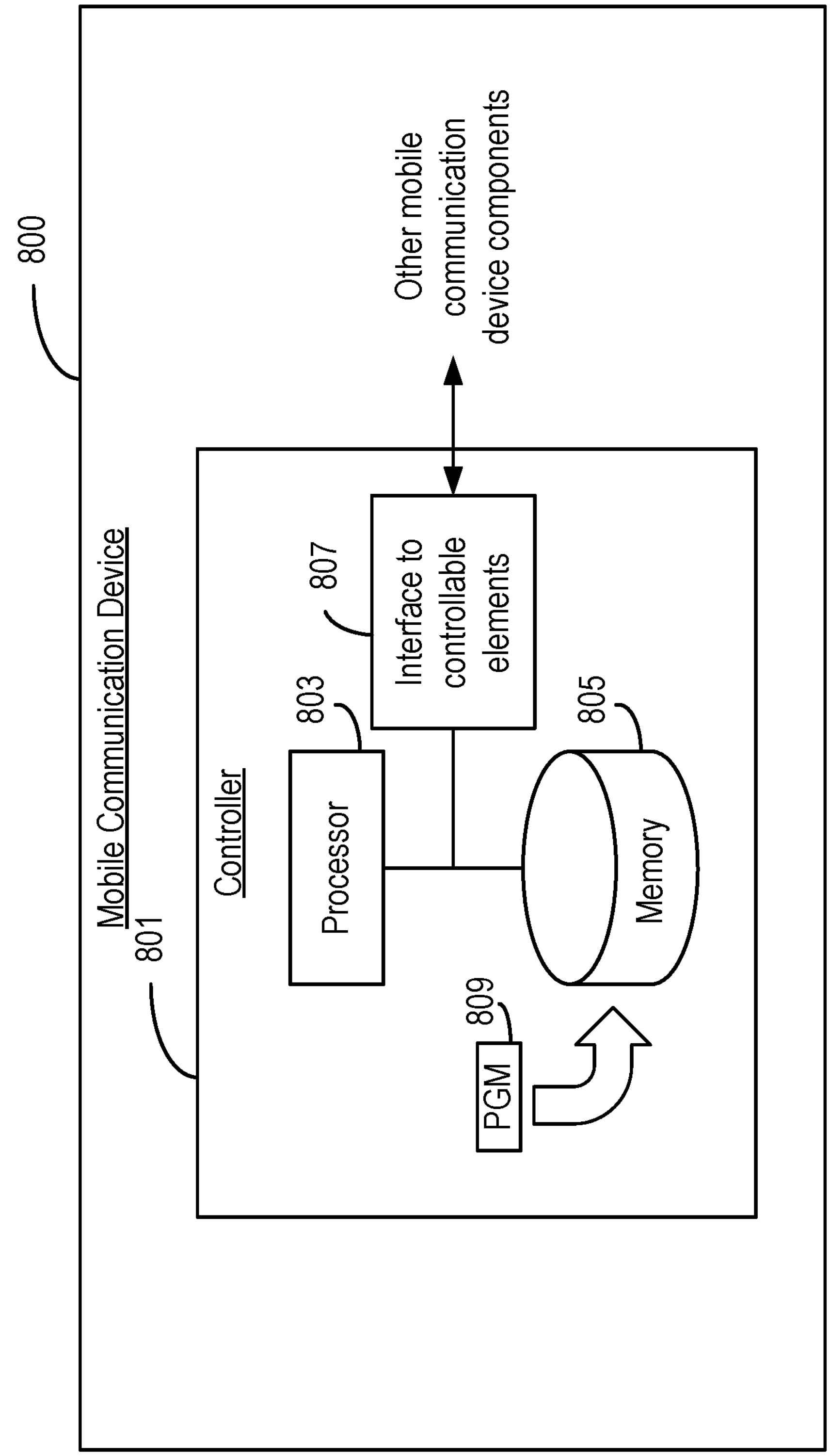
FIG. 8 illustrates an exemplary controller of a mobile communication device in accordance with some but not necessarily all exemplary embodiments consistent with the invention.

Aspects of an exemplary controller 801 that may be included in a radar-capable mobile communication device 800 to cause any and/or all of the above-described actions to be performed as discussed in the various embodiments are shown in FIG. 8, which illustrates an exemplary controller 801 of a mobile communication device 800 in accordance with some but not necessarily all exemplary embodiments consistent with the invention. In particular, the controller 801 includes circuitry configured to carry out any one or any combination of the various functions described above. Such circuitry could, for example, be entirely hard-wired circuitry (e.g., one or more Application Specific Integrated Circuits—"ASICs"). Depicted in the exemplary embodiment of FIG. 8, however, is programmable circuitry, comprising a processor 803 coupled to one or more memory devices 805 (e.g., Random Access Memory, Magnetic Disc Drives, Optical Disk Drives, Read Only Memory, etc.) and to an interface 807 that enables bidirectional communication with other elements of the mobile communication device 800. The memory device(s) 805 store program means 809 (e.g., a set of processor instructions) configured to cause the processor 803 to control other system elements so as to carry out any of the aspects described above. The memory device(s) 805 may also store data (not shown) representing various constant and variable parameters as may be needed by the processor 803 and/or as may be generated when carrying out its functions such as those specified by the program means 809.

To further facilitate an understanding of various aspects of inventive embodiments, the following outline presents some important features:

UE-R determines a suitable occasion for radar transmission during one or more GPs; if a suitable occasion is available, the UE-R performs a radar operation in the (suitable) GP

- "Suitability" includes the radar operation being safe in terms of the radar transmission not causing interference to others
  - A suitable occasion avoids causing interference to a BS during UL symbol times
  - A suitable occasion avoids causing interference to other UEs during DL symbol times
    - To facilitate the prevention of interference to other UEs, the UE-R can, for example, detect the presence of other UEs based on previously observed UL transmissions; an estimate of the other UEs' distance can be made via a detected timing difference with respect to a known local (at the UE-R) TA value
- Suitability also includes an ability for the UE-R to receive its own backscattered radar signal
  - In this respect, the timing of the radar transmission should be such that transmission will take place in an appropriate timing window so the backscattered signal will return while cellular signals from BS or from other UEs will reach the UE-R below a maximum permissible interference threshold level
- Determining a suitable time for perform the radar operation therefore includes selection of an appropriate GP and which part (fraction) of it to use
  - Embodiments can be designed to use UL-to-DL GPs, DL-to-UL GPs, or both
  - Selection is, at least in part, based on UE-R conditions in the serving cell
    - Based on distance/propagation time and/or RF signal path loss to the BS and other UEs
      - A principle applied in some but not necessarily all embodiments is that a UE-R that is relatively far away from the BS preferably uses an UL-to-DL GP; a UE-R that is relatively close to the BS preferably uses a DL-to-UL GP
  - Selection of a suitable time for radar operation can, in some embodiments, be based on UE-R conditions in relation to other cells
    - Interference to/from neighbor cells is considered in these embodiments
    - 'Interference to/from other cells in heterogeneous NW can also be considered in some but not necessarily all embodiments
  - In some but not necessarily all inventive embodiments, selection is based on a time budget model that includes multiple types of contributions, such as but not limited to:
    - TDD guard configuration (e.g., duration of TDD)
    - Network (NW) synchronization tolerances
    - UE tolerances for transmitter ON/OFF switching times, UE capability with respect to TA accuracy, UE capability with respect to radar antenna switching speed, UE radar transmission power; UE's accuracy when controlling radar transmission power, radar transmission and listening durations, etc.
    - Distance-related propagation delays
- In some but not necessarily all embodiments, determining a suitable time for performing radar operation includes the NW providing assistance information to the UE-R
- In some but not necessarily all embodiments, determining a suitable time for performing radar operation includes UE-R providing assistance info to NW
- In some but not necessarily all embodiments, if a suitable occasion for performing a radar operation is not available, an alternative action is performed, including but not limited to:
  - coordinating with the network to transmit the radar signal during non-GP symbols
  - applying a range-dependent TPC to avoid affecting other nodes (either BS or UEs)

Although various aspects of inventive embodiments have been described with respect to 3GPP cellular radio access technology, it will be appreciated that the class of inventive embodiments is not limited to 3GPP cellular radio access technology. To the contrary, inventive aspects can also apply to other types of TDD communication systems that include the presence of guard or equivalent TDD transmission direction transition periods.

Further, although the various exemplary embodiments have for the most part been described with respect to monostatic radar, this is merely for purposes of illustration. However, the various aspects of inventive embodiments can also be applied in bistatic radar and multistatic radar use cases.

Embodiments consistent with the invention provide any number of the following advantages over conventional technology:

1. Transmission of radar signals and reception of the corresponding backscattered signals can be scheduled autonomously by the UE-R without involving a central control unit (e.g., a BS in the communication network).
2. Interference from radar signals to base stations and to other nearby UEs can be avoided.
3. Co-existence of Radar and 5G communication is enabled.
4. A complete radar coverage can be achieved without involving a central control unit (e.g., a BS), or sharing information with the surrounding UEs.

The invention has been described with reference to particular embodiments. However, it will be readily apparent to those skilled in the art that it is possible to embody the invention in specific forms other than those of the embodiment described above. Thus, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

The invention claimed is:

1. A method of performing a radar sensing function in a mobile communication device that operates in a Time Division Duplex (TDD) wireless communication system having an air interface that comprises a plurality of uplink symbol times, a plurality of downlink symbol times, a plurality of TDD transmission direction transition periods, and a plurality of transition pairs of symbol times, wherein each of the transition pairs of symbol times comprises one of the uplink symbol times and one of the downlink symbol times, and each of the TDD transmission direction transition periods is associated with one of the plurality of transition pairs of symbol times and is immediately preceded by a first one of the uplink and downlink symbol times of the associated transition pair of symbol times and is immediately followed by a second one of the uplink and downlink symbol times of the associated transition pair of symbol times, the method comprising:

- using information about a path delay between the mobile communication device and a receiver as one of one or more bases to determine a timing of a radar operation window at the mobile communication device comprising a radar signal transmission period and a radar backscatter reception period, wherein the determined timing of the radar operation window is configured to:
  - cause the radar signal, when transmitted from the mobile communication device within the determined radar signal transmission period, to arrive at the receiver during a portion of a first TDD transmission direction transition period of the receiver; and
  - cause a radar backscatter signal to arrive at the mobile communication device during the radar backscatter reception period; and
- transmitting the radar signal within the determined radar signal transmission period.

2. The method of claim 1, wherein the receiver is a receiver of a serving base station in the TDD wireless communication system, and wherein using the information about the path delay between the mobile communication device and the receiver as one of one or more bases to determine the timing of the radar operation window comprises:

- selecting one of the TDD transmission direction transition periods of the receiver that is immediately preceded by one of the uplink symbol times if the path delay between the mobile communication device and the serving base station in the TDD wireless communication system is greater than a first predetermined threshold amount; and
- selecting one of the TDD transmission direction transition periods of the receiver that is immediately preceded by one of the downlink symbol times if the path delay between the mobile communication device and the serving base station in the TDD wireless communication system is less than a second predetermined threshold amount.

3. The method of claim 2, wherein the second predetermined threshold amount is less than or equal to the first predetermined amount.

4. The method of claim 1, wherein the one or more bases that are used to determine the timing of the radar operation window includes an amount of path loss between the mobile communication device and another receiving device in the TDD wireless communication system.

5. The method of claim 1, wherein the one or more bases that are used to determine the timing of the radar operation window includes an RF signal propagation time between the mobile communication device and at least one other wireless communication device being served in the TDD wireless communication system.

6. The method of claim 1, wherein the one or more bases that are used to determine the timing of the radar operation window includes an amount of interference that the radar signal would cause in a neighboring cell in the TDD wireless communication system.

7. The method of claim 1, wherein the one or more bases that are used to determine the timing of the radar operation window includes an amount of interference from a neighboring cell that would be coincident with one or both of the transmitted radar signal and backscatter from the transmitted radar signal.

8. The method of claim 1, wherein the one or more bases that are used to determine the timing of the radar operation window includes a time budget model that comprises two or more of:

- network synchronization tolerances;
- mobile communication device tolerances for switching times;
- a measure of mobile communication device accuracy with respect to Timing Advance;
- a measure of mobile communication device Transmission/Reception switching speed;
- a measure of mobile communication device receive and transmit timing accuracy;
- distance-related propagation delays;
- a detection range of radar operation;
- a power of transmission of the radar signal;
- a base station transmitter ON/OFF switching time; and
- a mobile communication device transmitter ON/OFF switching time.

9. The method of claim 1, wherein the one or more bases that are used to determine the timing of the radar operation window includes information received by the mobile communication device from the wireless communication system.

10. The method of claim 1, wherein the first TDD transmission direction transition period of the receiver is one of the TDD transmission direction transition periods that is immediately preceded by one of the uplink symbol times, and wherein the one or more bases that are used to determine the timing of the radar operation window includes an assessment of uplink interference at the serving base station that will be caused by the radar signal when transmitted from the mobile communication device.

11. The method of claim 1, wherein the first TDD transmission direction transition period of the receiver is one of the TDD transmission direction transition periods that is immediately preceded by one of the uplink symbol times, and wherein the one or more bases that are used to determine the timing of the radar operation window includes an assessment of uplink interference at a neighboring base station that will be caused by the radar signal when transmitted from the mobile communication device.

12. The method of claim 1, wherein the first TDD transmission direction transition period is one of the TDD transmission direction transition periods that is immediately preceded by one of the uplink symbol times, and wherein the one or more bases that are used to determine the timing of the radar operation window includes an assessment of downlink interference at one or more other mobile communication devices that will be caused by the radar signal when transmitted from the mobile communication device.

13. The method of claim 1, wherein the first TDD transmission direction transition period is one of the TDD transmission direction transition periods that is immediately preceded by one of the downlink symbol times, and wherein the one or more bases that are used to determine the timing of the radar operation window includes an assessment of downlink interference at one or more other mobile communication devices that will be caused by the radar signal when transmitted from the mobile communication device.

14. The method of claim 1, wherein the first TDD transmission direction transition period is one of the TDD transmission direction transition periods that is immediately preceded by one of the downlink symbol times, and wherein the one or more of bases that are used to determine the timing of the radar operation window includes an assessment of uplink interference that will be caused by the radar signal at one or both of a serving base station in the TDD wireless communication system and another base station when the radar signal is transmitted from the mobile communication device.

15. A non-transitory computer readable storage medium comprising instructions that, when executed by at least one processor, causes the at least one processor to carry out a method of performing a radar sensing function in a mobile communication device that operates in a Time Division Duplex (TDD) wireless communication system having an air interface that comprises a plurality of uplink symbol times, a plurality of downlink symbol times, a plurality of TDD transmission direction transition periods, and a plurality of transition pairs of symbol times, wherein each of the transition pairs of symbol times comprises one of the uplink symbol times and one of the downlink symbol times, and each of the TDD transmission direction transition periods is associated with one of the plurality of transition pairs of symbol times and is immediately preceded by a first one of the uplink and downlink symbol times of the associated transition pair of symbol times and is immediately followed by a second one of the uplink and downlink symbol times of the associated transition pair of symbol times, wherein the method comprises:

using information about a path delay between the mobile communication device and a receiver as one of one or more bases to determine a timing of a radar operation window at the mobile communication device comprising a radar signal transmission period and a radar backscatter reception period, wherein the determined timing of the radar operation window is configured to:

cause the radar signal, when transmitted from the mobile communication device within the determined radar signal transmission period, to arrive at the receiver during a portion of a first TDD transmission direction transition period of the receiver; and cause a radar backscatter signal to arrive at the mobile communication device during the radar backscatter reception period; and transmitting the radar signal within the determined radar signal transmission period.

16. An apparatus configured for performing a radar sensing function in a mobile communication device that operates in a Time Division Duplex (TDD) wireless communication system having an air interface that comprises a plurality of uplink symbol times, a plurality of downlink symbol times, a plurality of TDD transmission direction transition periods, and a plurality of transition pairs of symbol times, wherein each of the transition pairs of symbol times comprises one of the uplink symbol times and one of the downlink symbol times, and each of the TDD transmission direction transition periods is associated with one of the plurality of transition pairs of symbol times and is immediately preceded by a first one of the uplink and downlink symbol times of the associated transition pair of symbol times and is immediately followed by a second one of the uplink and downlink symbol times of the associated transition pair of symbol times, the apparatus configured to:

use information about a path delay between the mobile communication device and a receiver as one of one or more bases to determine a timing of a radar operation window at the mobile communication device comprising a radar signal transmission period and a radar backscatter reception period, wherein the determined timing of the radar operation window is configured to:

cause the radar signal, when transmitted from the mobile communication device within the determined radar signal transmission period, to arrive at the receiver during a portion of a first TDD transmission direction transition period of the receiver; and cause a radar backscatter signal to arrive at the mobile communication device during the radar backscatter reception period; and transmit the radar signal within the determined radar signal transmission period.

17. The apparatus of claim 16, wherein the first TDD transmission direction transition period is one of the TDD transmission direction transition periods that is immediately preceded by one of the downlink symbol times, and wherein the one or more of bases that are used to determine the timing of the radar operation window includes an assessment of uplink interference that will be caused by the radar signal at one or both of a serving base station in the TDD wireless communication system and another base station when the radar signal is transmitted from the mobile communication device.

18. The apparatus of claim 16, wherein the receiver is a receiver of a serving base station in the TDD wireless communication system, and wherein using the information about the path delay between the mobile communication device and the receiver as one of one or more bases to determine the timing of the radar operation window comprises:

selecting one of the TDD transmission direction transition periods of the receiver that is immediately preceded by one of the uplink symbol times if the path delay between the mobile communication device and the serving base station in the TDD wireless communication system is greater than a first predetermined threshold amount; and selecting one of the TDD transmission direction transition periods of the receiver that is immediately preceded by one of the downlink symbol times if the path delay between the mobile communication device and the serving base station in the TDD wireless communication system is less than a second predetermined threshold amount.

19. The apparatus of claim 18, wherein the second predetermined threshold amount is less than or equal to the first predetermined amount.

20. The apparatus of claim 16, wherein the one or more bases that are used to determine the timing of the radar operation window includes an amount of path loss between the mobile communication device and another receiving device in the TDD wireless communication system.

21. The apparatus of claim 16, wherein the one or more bases that are used to determine the timing of the radar operation window includes an RF signal propagation time between the mobile communication device and at least one other wireless communication device being served in the TDD wireless communication system.

22. The apparatus of claim 16, wherein the one or more bases that are used to determine the timing of the radar operation window includes an amount of interference that the radar signal would cause in a neighboring cell in the TDD wireless communication system.

23. The apparatus of claim 16, wherein the one or more bases that are used to determine the timing of the radar operation window includes an amount of interference from a neighboring cell that would be coincident with one or both of the transmitted radar signal and backscatter from the transmitted radar signal.

24. The apparatus of claim 16, wherein the one or more bases that are used to determine the timing of the radar operation window includes a time budget model that comprises two or more of:

network synchronization tolerances;

mobile communication device tolerances for switching times;

a measure of mobile communication device accuracy with respect to Timing Advance;

a measure of mobile communication device Transmission/Reception switching speed;

a measure of mobile communication device receive and transmit timing accuracy;

distance-related propagation delays;

a detection range of radar operation;

a power of transmission of the radar signal;

a base station transmitter ON/OFF switching time; and a mobile communication device transmitter ON/OFF switching time.

25. The apparatus of claim 16, wherein the one or more bases that are used to determine the timing of the radar operation window includes information received by the mobile communication device from the wireless communication system.

26. The apparatus of claim 16, wherein the first TDD transmission direction transition period of the receiver is one of the TDD transmission direction transition periods that is immediately preceded by one of the uplink symbol times, and wherein the one or more bases that are used to determine the timing of the radar operation window includes an assessment of uplink interference at the serving base station that will be caused by the radar signal when transmitted from the mobile communication device.

27. The apparatus of claim 16, wherein the first TDD transmission direction transition period of the receiver is one of the TDD transmission direction transition periods that is immediately preceded by one of the uplink symbol times, and wherein the one or more bases that are used to determine the timing of the radar operation window includes an assessment of uplink interference at a neighboring base station that will be caused by the radar signal when transmitted from the mobile communication device.

28. The apparatus of claim 16, wherein the first TDD transmission direction transition period is one of the TDD transmission direction transition periods that is immediately preceded by one of the uplink symbol times, and wherein the one or more bases that are used to determine the timing of the radar operation window includes an assessment of downlink interference at one or more other mobile communication devices that will be caused by the radar signal when transmitted from the mobile communication device.

29. The apparatus of claim 16, wherein the first TDD transmission direction transition period is one of the TDD transmission direction transition periods that is immediately preceded by one of the downlink symbol times, and wherein the one or more bases that are used to determine the timing of the radar operation window includes an assessment of downlink interference at one or more other mobile communication devices that will be caused by the radar signal when transmitted from the mobile communication device.

* * * * *